UNITED STATES PATENT OFFICE.

LAFAYETTE COLTRIN, OF OMAHA, NEBRASKA, ASSIGNOR OF ONE-HALF TO AMBROSE H. LEE, OF OMAHA, NEBRASKA.

FOOD PRODUCT.

No. 904,047.  Specification of Letters Patent.  Patented Nov. 17, 1908.

Application filed February 28, 1908. Serial No. 418,231.

*To all whom it may concern:*

Be it known that I, LAFAYETTE COLTRIN, a citizen of the United States, residing at Omaha, in the county of Douglas and State of Nebraska, have invented certain new and useful Food Products, of which the following is a specification.

This invention relates to food product and has for its principal object the utilization of flax seed as an article of food for human beings. This seed contains 24 per cent. albuminous substances, 34 per cent. of oil, and of absorbents 30 per cent.; its nutrient qualities are therefore considerable, and on account of the oil it operates as an alterative, highly efficient as a remedy for indigestion, constipation and kindred diseases.

By reason of the unpleasant taste, flax seed has not and could not be used, generally, as an article of food. Also, any article which might be employed to modify the taste of the flax seed, and used in connection therewith, would not be practical unless the flavoring is made permanent, so that exposure to the air, thereafter, or handling incident to the uses of the food, would not impair or lessen the degree of flavor.

In the present instance the above mentioned obstacles are overcome, and an article of food is produced containing the desirable medical properties of flax seed, which is highly nutritive and permanently flavored, so that it may be used at any time, as an agreeable diet. It has been found that the food forms a desirable breakfast food and it may be used with cream and sugar after the manner of oatmeal. The laxative effect of the food renders it highly efficient as a remedy for constipation.

The food is prepared as follows: The flax seed is ground or pulverized to the consistency, substantially, of ordinary meal; the taste of this meal is repellent to many and unpleasant to all. I employ a quantity of wheat, the berries of wheat being used whole, and use a proportion, preferably, in weight of two-thirds wheat with one-third flax seed, but have used the proportions of one-half of each to advantage.

The berries of wheat are steam-cooked in a closed receptacle. I employ a flavoring extract adapted to effect a change in the taste of the flax seed, and for this purpose I have used extract of celery to advantage. This extract is distributed with the berries of wheat at the time the latter is steam-cooked, and is assimilated with and absorbed by the wheat in a manner so that its aroma is not thereafter lost.

The wheat is removed from the steam-cooker in a plastic condition, and by use of a separate receptacle is partly dried, and while semi-plastic, is flaked by being pressed through rollers. After the wheat has been flaked it is baked or parched until it is crisp or brittle; the wheat flakes are then broken in any convenient manner, as by the passage thereof through corrugated rollers. The flavor of the extract will be found to be very pronounced at this time, upon tasting the product, and it will be held thereafter, without diminution, when afterwards exposed to the air or handled.

The product thus described, is then thoroughly mixed with the comminuted flax seed, any convenient means being employed for this purpose; the food thus prepared is very palatable, and, as above stated, the use of this food product is highly nutritious, is easily digested, and on account of the oil and absorbent parts of the flax-seed, operates as an alterative, found to be of utility.

I have employed other extracts than celery, and do not limit myself to the use of this particular extract, though, for many reasons it is preferred; also I do not limit myself to the use of wheat, as I may employ a substitute therefor.

The object of the invention is to produce a suitable food combination, wherein and whereby, flax seed may be utilized as an article of diet, the disagreeable taste of the flax seed, when used in the compound, being permanently eliminated therefrom. This I accomplish, as before stated, by adding a cereal and a flavoring extract. Any kind or form of cereal may be employed or any suitable form of flavoring extract.

Having fully described my invention, what I claim as new and desire to secure by Letters Patent, is,—

1. The herein described food product comprising comminuted flax seed used substantially in the proportion of one-third, a cereal intermixed therewith and used substantially in the proportion of two thirds, and a flavoring extract used in the composite mass sufficient to modify the taste thereof.

2. The herein described food product, comprising comminuted flax seed used substantially in the proportion of one-third, a cereal intermixed therewith and used, substantially in the proportion of two-thirds, and extract of celery used in the composite mass sufficient to modify the taste of the product.

3. The herein described food product, comprising comminuted flax seed used substantially in the proportion of one-third, flaked wheat intermixed therewith and used, substantially in the proportion of two-thirds, and a vegetable extract used in the composite mass sufficient in quantity to modify the taste of the product.

4. A food product for human beings comprising comminuted flax seed used in the proportions of from one-third to one-half, a cereal intermixed therewith and a flavoring extract used in the composite mass sufficient to modify the taste thereof.

5. A food product for human beings comprising comminuted flax seed used in the proportions of from one third to one half, a cereal intermixed therewith and a flavoring of celery extract used in the composite mass sufficient to modify the taste thereof.

6. A food product for human beings comprising comminuted flax seed used in the proportions of from one third to one half, a flaked cereal intermixed therewith, and a flavoring extract sufficient to modify the taste of the composite mass.

In testimony whereof I have affixed my signature in presence of two witnesses.

LAFAYETTE COLTRIN.

Witnesses:
  C. W. BRITT,
  TOM LEE.